UNITED STATES PATENT OFFICE 3,497,346
Patented Feb. 24, 1970

3,497,346
BENZYL HALIDES AS POST-EMERGENCE HERBICIDES
Stanley T. D. Gough, Somerset County, and Roger P. Napier, Middlesex County, N.J., assignors to Mobil Oil Corporation, a corporation of New York
No Drawing. Filed June 18, 1968, Ser. No. 737,830
Int. Cl. A01n 9/20, 9/24; C07c 121/52
U.S. Cl. 71—105                                                                   6 Claims

ABSTRACT OF THE DISCLOSURE

Benzyl halides having carbalkoxy or cyano ring substituents are effective post-emergence herbicides.

BACKGROUND OF THE INVENTION

Field of the invention

This invention relates to post-emergence herbicides. It is more particularly concerned with the use of certain benzyl halides as post-emergence herbicides.

DESCRIPTION OF THE PRIOR ART

Trichlorobenzyl chloride has been proposed for use in herbicidal formulations. Insofar as is now known, carbalkoxy- and cyano-substituted benzyl halides have not been known as herbicides.

SUMMARY OF THE INVENTION

This invention provides a method for the post-emergence control of undesirable plants that comprises applying thereto an herbicidal amount of a composition containing an active ingredient having the formula:

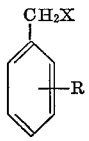

wherein R is carbalkoxy ($C_1$–$C_4$) or cyano, and X is halogen.

DESCRIPTION OF SPECIFIC EMBODIMENTS

The compounds used as post-emergence herbicides, in accordance with this invention, are benzyl halides (preferably bromides or chlorides) that have a cyano or a carbalkoxy substitutent on the ring. In the case of the carbalkoxy substitutent, —COOR′, R′ is a branched or straight chain alkyl group having 1–4 carbon atoms. They are readily prepared by known methods, usually by halogenation of the methyl group of a cyano toluene or an alkyl toluate. Non-limiting examples of these compounds are o-carbomethoxybenzyl fluoride, o-carbomethoxybenzyl chloride, m-carbethoxybenzyl iodide, m-carbopropoxybenzyl fluoride, m-carbobutoxybenzyl chloride, p-carbisopropoxybenzyl chloride, p-carbisopropoxybenzyl iodide, o-carbisobutoxybenzyl bromide, o-cyanobenzyl chloride, o-cyanobenzyl iodide, m-cyanobenzyl fluoride, m-cyanobenzyl chloride, p-cyanobenzyl chloride, and p-cyanobenzyl iodide.

In carrying out the method of this invention for controlling plant growth, the herbicides can be applied in various ways. They can be applied per se, but they are usually applied as the toxic components in herbicidal compositions, comprising an herbicidal amount of the herbicide and a carrier for the herbicide. Compositions can be applied as dust, as liquid sprays, or as gas-propelled sprays. In addition to the carrier, they can contain additives such as emulsifying agents, wetting agents, binding agents, gases compressed to the liquid state, odorants and stabilizers. A wide variety of liquid and solid carriers can be used. Non-limiting examples of solid carriers include talc, bentonite, diatomaceous earth, pyrophyllite, fuller's earth, gypsum, flours derived from cottonseeds and nut shells, and various natural and synthetic clays having a pH not exceeding about 9.5. Non-limiting examples of liquid carriers include water; organic solvents such as alcohols, ketones, amides, and esters; mineral oils such as kerosine, light oils, and medium oils; and vegetable oils such as cottonseed oil.

The exact quantity of the compounds of this invention to be utilized in herbicidal compositions, as is well known to those skilled in the art, will be found to vary rather widely. It depends to some extent on the type of the composition in which the material is being employed, the method of application, the nature of the condition to be controlled, and other commonly encountered factors. In practice, herbicidal application is measured in terms of pounds of herbicides applied per acre. The compounds of this invention are effective when applied in herbicidal amounts, i.e., in rates between about two pounds and about ten pounds per acre.

HERBICIDE TESTS

Pre-and post-emergence herbicide tests method of propagating test species

| | |
|---|---|
| Crabgrass | Digitaria sanguinalis. |
| Yellow foxtail grass | Setaria glauca. |
| Johnson grass | Sorghum halepense. |
| Barnyard grass | Echinochloa crus-galli. |
| Amaranth pigweed | Amaranthus retroflexus. |
| Turnip | Brassica sp. |
| Cotton | Gossypium hirsutum var. DPL smooth leaf. |
| Corn | Zea mays. |
| Bean | Phaseolus vulgaris var. Black Valentine. |

All crop and weed species were planted individually in 3″ plastic pots containing potting soil. Four seeds each of corn, cotton, and snapbeans were seeded to a depth equal to the diameter of the seed. Immediately after planting, all pots were watered by sub-irrigation in greenhouse trays. Pots for the pre-emergence phase were seeded one day before treatment.

Planting dates for the post-emergence phase were varied so that all seedlings would reach the desired stage of development simultaneously. The proper stage of seedlings development for treatment in the post-emergence phase is as follows:

| | |
|---|---|
| Grasses | 2″ in height. |
| Pigweed and turnips | 1 or 2 true leaves above visible cotyledons. |
| Cotton | First true leaf 1″ in length, expanded cotyledons. |
| Corn | 3″–4″ in height. |
| Bean | Primary leaves expanded, growing point at primary leaf nodes. |

METHOD OF TREATMENT

Compounds were tested at rates of application equivalent to 8 pounds of actual compound per acre in a spray volume of 38 gallons per acre. Spray hood constants required to deliver the above volume are as follows:

| | |
|---|---|
| Belt speed | 2 m.p.h. |
| Air pressure | Adjusted to provide 38 gal./per acre delivery. |
| Nozzle tip | To provide uniform cross-section flay spray. |

Formulations for spray applications were prepared in 50 ml. volumes with the following three components:

(1) 1.24 grams of compound (8 lbs./acre rate).
(2) 49 ml. acetone or acetone-water combination.
(3) 1 ml. of Tween-20.

Spray applications were made in a hood containing a removable belt and fixed spray nozzle. For passage through the spray hood, one pot of each specie (pre-emergence phase) was placed on the forward half of a wooden flat and one pot of established plants (post-emergence phase) was placed on the rear half of the flat. Treatments were removed to the greenhouse after spraying. Watering during the observation period was done only by sub-irrigation.

THE METHOD OF RECORDING RESULTS

Two weeks after treatment, pre- and post-emergent injury or control was visually rated, and the results were as shown in the following table. Injury is rated as percent injury or control.

EXAMPLE 1 p-Carbomethoxybenzyl bromide was prepared as described by Julia and Chastrette, Bull. Soc. Chim., France, 1962, 2247, by brominating methyl-p-toluate with N-bromosuccinimide.

EXAMPLE 2

Using the method of Example 1, also described for photobromination by Eliel and Rivard, J. Org. Chem., 17, 1252 (1952), o-carbomethoxybenzyl bromide was prepared by brominating methyl-o-toluate.

EXAMPLE 3

Using the method of Example 1, also described for photobromination by Turner and Gearien, J. Org. Chem., 24, 1592 (1959), m-carbomethoxybenzyl bromide was prepared by brominating methyl-m-toluate.

EXAMPLE 4

Using the method of Example 1, o-carbisopropoxy-benzyl bromide was prepared by brominating isopropyl-o-toluate.

EXAMPLE 5

Using the method of Example 1, m-carbisopropoxy-benzyl bromide was prepared by brominating isopropyl-m-toluate.

EXAMPLE 6

Using the method of Example 1, p-carbisopropoxy-benzyl bromide was prepared by brominating isopropyl-p-toluate.

EXAMPLE 7 p-Cyanobenzyl bromide was prepared as described by Julia and Chastrette, Bull. Soc. Chim., France, 1962, 2247, by the bromination of p-tolunitrile with N-bromosuccinimide.

EXAMPLE 8

Using the method of Example 7, also described by Ipatieff et al., m-cyanobenzyl bromide was prepared by brominating m-tolunitrile.

EXAMPLE 9

Using the method of Example 7, also described by Tcheou et al., J. Chinese Chem. Soc., 17, 150 (1950), o-cyanobenzyl bromide was prepared by brominating o-tolunitrile.

The compounds of Examples 1 through 9 were subjected to the aforedescribed herbicide test. The results of post-emergence tests at a dosage of eight pounds per acre are set forth in the following table.

TABLE

| Plant | 1 | 2 | 3 | Example number 4 | 5 | 6 | 7 | 8 | 9 |
|---|---|---|---|---|---|---|---|---|---|
| Crab grass | 90 | 70 | 90 | 60 | 90 | 90 | 60 | 90 | 100 |
| Yellow foxtail | 70 | 80 | 60 | 50 | 40 | 60 | 30 | 50 | 60 |
| Johnson grass | 40 | 90 | 70 | 60 | 60 | 40 | 40 | 40 | 60 |
| Barnyard grass | 90 | 90 | 50 | 40 | 40 | 40 | 60 | 40 | 50 |
| Pigweed | 90 | 90 | 90 | | 100 | 100 | 90 | 90 | 90 |
| Turnip | 100 | 100 | 100 | | 90 | 90 | 100 | 100 | 100 |
| Cotton | 70 | 100 | 30 | 50 | 70 | 50 | 90 | 50 | 60 |
| Corn | 20 | 100 | 20 | 100 | 90 | 100 | 30 | 30 | 20 |
| Bean | 30 | 40 | 50 | 40 | 90 | 90 | 90 | 90 | 50 |

Although the present invention had been described with preferred embodiments, it is to be understod that modifications and variations may be resorted to, without departing from the spirit and scope of this invention, as those skilled in the art will readily understand. Such variations and modifications are considered to be within the purview and scope of the appended claims.

What is claimed is:

1. A method for the post-emergence control of undesirable plants that comprises applying thereto an herbicidal amount of a composition containing an active ingredient having the formula:

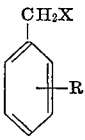

wherein R is carbalkoxy ($C_1$–$C_4$) or cyano, and X is halogen.

2. The method of claim 1, wherein said active ingredient is p-carbomethoxybenzyl bromide.
3. The method of claim 1, wherein said active ingredient is m-carbomethoxybenzyl bromide.
4. The method of claim 1, wherein said active ingredient is p-cyanobenzyl bromide.
5. The method in claim 1, wherein said active ingredient is m-cyanobenzyl bromide.
6. The method of claim 1, wherein said active ingredient is o-cyanobenzyl bromide.

References Cited

UNITED STATES PATENTS 2,724,643  11/1955  Morris et al. ---------- 71—107
3,419,626  12/1968  Pyne et al. ---------- 71—126

FOREIGN PATENTS 1,108,978  6/1961  Germany.

OTHER REFERENCES

Schultz et al.: "Subs. Der. of Acetic Acid" (1964), C.A. 62, pp. 14577–82 (1965).

Cragoe et al.: "Synthetic Antiviral Agents," (1957), C.A. 52, pp. 8098–8101 (1958).

Turner et al.: "Synthesis of Resorpine Analogs," (1959), C.A. 54, pp. 11013–14 (1960).

Lobov et al.: "Method for Destroying Weeds," (1966), C.A. 65, p. 11262 (1966).

Lobov et al.: "Control of Green and Blue Green Algae, Etc.," (1966), C.A. 65, pp. 6920–21 (1966).

Godfrey: "Herbicidal Halogenated Toluene Ders.," (1961), C.A. 55, p. 18001 (1961).

LEWIS GOTTS, Primary Examiner

G. HOLLRAH, Assistant Examiner

U.S. Cl. X.R.

71—107; 260—465, 476